United States Patent [19]
Hazelett, Jr.

[11] 3,789,102
[45] Jan. 29, 1974

[54] METHOD FOR FORMING A FLANGED CONCRETE PANEL HAVING A PLANAR CENTRAL SECTION

[75] Inventor: Earl T. Hazelett, Jr., Phoenix, Ariz.

[73] Assignee: Continental Homes, Inc., Pheonix, Ariz.

[22] Filed: Feb. 26, 1971

[21] Appl. No.: 119,159

Related U.S. Application Data
[63] Continuation-in-part of Ser. No. 2,263, Jan. 12, 1970, abandoned.

[52] U.S. Cl. ............... 264/295, 264/313, 264/339, 264/DIG. 43
[51] Int. Cl. ............................................. B28b 21/92
[58] Field of Search ... 264/228, 229, 295, 313, 333, 264/336, 339, DIG. 43; 425/111; 25/118 T; 52/223

[56] References Cited
UNITED STATES PATENTS

| | | | |
|---|---|---|---|
| 2,505,342 | 4/1950 | Schaaf | 264/71 X |
| 3,632,730 | 1/1972 | Cotton | 264/295 |
| 3,604,324 | 9/1971 | Middlestadt | 264/101 |
| 2,729,850 | 1/1956 | Dewees | 264/277 X |

Primary Examiner—Robert F. White
Assistant Examiner—Thomas P. Pavelko
Attorney, Agent, or Firm—Wood, Herron & Evans

[57] ABSTRACT

Fabrication of a flanged concrete panel includes pouring concrete into a suitably configured mold of elastically deformable material in which reinforcing frame and mesh is appropriately located; partially curing the panel while supporting the mold such that under the weight of the concrete contained therein it deflects in a direction countervailing the normal shrinkage deformation direction. The partially cured panel is removed from the mold and allowed to undergo its normal curing shrinkage deformation to yield a panel having a planar face.

9 Claims, 23 Drawing Figures

PATENTED JAN 29 1974 3,789,102

INVENTOR.
Earl T. Hazelett, Jr.
BY
Wood, Herron & Evans
ATTORNEYS

INVENTOR
Earl T. Hazelett, Jr.
BY
Wood, Herron & Evans
ATTORNEYS

PATENTED JAN 29 1974

INVENTOR.
Earl T. Hazelett, Jr.
BY
Wood, Herron & Evans
ATTORNEYS

METHOD FOR FORMING A FLANGED CONCRETE PANEL HAVING A PLANAR CENTRAL SECTION

This application is a continuation-in-part of application Ser. No. 2,263, filed Jan. 12, 1970, in the name of Earl T. Hazelett, Jr., entitled "Flanged Concrete Panel and Fabrication Method and Apparatus Therefor", which application is now abandoned.

This invention relates to concrete panels; and more particularly to reinforced concrete panels having a peripheral flange or rim, and apparatus and method for fabricating such panels free of deformation or warpage due to curing-induced shrinkage.

Panels of the general type to which this invention relates, although not exclusively so, typically include a relatively thin flat central section or slab which has formed integrally therewith at its periphery a flange or rim which projects perpendicularly from one surface thereof herein termed the "rear" surface. The panel surface opposite the rear surface, herein termed the front or face, is a continuous unobstructed flat surface inasmuch as the rim or flange does not extend in this direction. Preferably the panels are reinforced with a rectangular frame embedded in the flange and a rectangular mesh, which is secured to the frame, embedded in the central section. Flange panels of this type, particularly if reinforced in the manner indicated, have a very high strength-to-weight ratio. As a consequence, for a given application having specific structural strength requirements, the weight of the panel, and hence its cost which is a direct function of its weight, is significantly reduced when compared to panels not having flanges since the latter must necessarily be thicker and hence heavier for the same application.

While the increased strength-to-weight ratio and consequent reduced cost of flanged concrete panels, particularly of the reinforced type, commend their use as a substitute for the thicker and more massive, and hence more expensive, panels of the unflanged type, it has prior to the time of this invention not been commercially feasible or practical to use these panels on a widespread basis. The reason therefor is that in the process of curing a freshly poured concrete panel the concrete shrinks as a consequence of the loss of water incident to curing. This shrinkage causes the panel to assume a final shape which is different from its original cast form, that is, the cast panel becomes deformed in a specified direction during the curing process as a consequence of the shrinkage. In the case of concrete panels of the type having flanges, the resulting deformation tends to give an arcuate shape to the end and side elevation lines of the panel. Stated differently, the curing-induced deformation in a specified direction tends to cause the front surface of the panel to become concave, and the rear convex. Such shrinkage deformation in panels of the flanged type is believed due to the fact that during curing the central section of the panel shrinks to a greater extent than the flange.

Ideally, it is desirable that the panel, once cast in an appropriately shaped mold conforming to the desired final panel configuration, should retain the same shape as the mold, that is, should retain its desired final form. Unfortunately, it has been found that a flanged concrete panel when formed in a mold configured to the desired final shape does not retain this shape during curing, but rather at the conclusion of curing has its front and rear surfaces deformed concavely and convexly, respectively, as noted. The shrinkage deformation problem during the curing of a flanged concrete panel is the same whether the shape desired is rectilinear or curvilinear. The problem, therefore, is to fabricate a flanged concrete panel which, upon curing, has the shape desired.

Accordingly, it has been an objective of this invention to provide a method for curing concrete panels of the flanged type such that at the conclusion of curing the finished concrete panel will have the desired final shape. This objective has been accomplished in accordance with certain of the principles of this invention by utilizing a method of fabrication which includes the steps of pouring the concrete in an appropriately configured mold; partially curing the panel in the mold; removing the partially cured panel from the mole; applying a force to the partially cured panel, preferably by loading it with a predetermined charge of material, such as water, to deform the panel in a direction countervailing the normal shrinkage deformation; and thereafter while the panel is deformed in such countervailing direction allowing it to further cure, thereby offsetting the normal deformation of the panel which occurs as a consequence of curing.

The foregoing method of panel fabrication aids in providing a panel having a final shape when fully cured which closely approximates the desired shape, that is, is free of apparent shrinkage deformation. The method is also advantageous because it accomplishes such result in an extremely convenient manner. Since the normal or natural shrinkage deformation of a flanged panel is such that the front surface is concave, the countervailing deformation required to produce an undeformed panel at the conclusion of curing is such that the front surface is convex. With the desired countervailing deformation of the panel such that the front surface thereof is convex, the rear surface of the panel from which the flange extends necessarily must have a concave countervailing deformation. With the countervailing deflection of the rear surface concave and surrounded by a flange, the loading or charging of the panel such that it deflects in the desired direction countervailing the normal shrinkage direction can be conveniently accomplished. Specifically, it is only necessary to support the partially cured panel horizontally at opposite ends thereof with the rear surface and flanges upward, and while so supported fill the cavity formed by the rear face and surrounding flange with a charge of water sufficient in amount to deflect the partially cured and end-supported panel to the extent necessary to offset the normal shrinkage deformation.

The method of this invention provides a further advantage, namely, the water used to deflect the mold performs a second and auxillary purpose, namely, leaching alkali from the concrete as it cures. Such alkali floats on the surface of the water and therefore is easily removed. As a consequence of the leaching, when the panel is installed in use as a fence wall to enclose a building, patio or the like, and subjected to water in the form of rain, alkali will not be leaching to the surface of the panel and stain it.

In accordance with a preferred method of fabricating the flanged concrete panel of this invention the concrete panel, prior to being removed from the mold and cured while deflected in a countervailing direction by the water or equivalent force is partially cured while still in the mold, which mold is deformed in a direction countervailing the normal shrinkage direction. Specifically, and pursuant to a preferred embodiment, the mold which is preferably fabricated of elastically deformable material, is supported at its center such that the mold elastically deflects, under the weight of the concrete panel cast therein, in a direction countervailing the normal shrinkage direction of the panel. While the mold is so deflected, the freshly poured concrete panel cast therein is permitted to partially cure, thereby imparting to the partially cured mold a deformation countervailing the normal shrinkage deformation. Upon completion of this initial panel curing phase in the elastically deflected mold, the deformed panel is removed from the mold, inverted, and allowed to further cure while supported at its ends and subjected to a charge of water, as described above.

The countervailing deformation initially imparted to freshly poured panels while partially curing in an elastically deformable mold deflected under the weight of the concrete further minimizes the degree to which the panel, when fully cured, departs due to natural shrinkage from the predetermined final configuration desired. The enhanced conformity of the resultant panel to the desired shape upon final curing, produced as a consequence of using the weight of the concrete to deflect an elastic mold in a countervailing direction, is particularly convenient and advantageous because it does not require the use of external forces to deflect the mold. It is necessary only to provide a mold which is elastically deformable and to support such mold in a manner such that under the weight of the freshly poured concrete contained therein it will deflect the requisite amount in a countervailing direction.

Of course, the mold could be permanently and/or pre-deformed prior to the concrete pouring step, in which event the reliance on the weight of the concrete for deflection is unnecessary. Alternatively, an elastic mold with contained concrete could be deflected by means other than the weight of concrete.

It has been a further objective of this invention to provide a reinforcing structure for a flanged concrete panel which is easily assembled, has a high degree of strength per unit weight, and retains its shape when subjected to the force of freshly poured concrete during the mold filling operation. This objective has been accomplished in accordance with certain additional principles of this invention by providing a reinforcing structure having a) a frame with an outwardly extending lip, preferably formed by two C-shaped channel members disposed in opposed relationship with their ends abutting and overlapped by short rigidifying bars placed in the channels of the frame sections at each end thereof, and b) a mesh which has its edges wrapped around one of the channel lips of the frame.

The reinforcing structure of this invention, by virtue of the lip and mesh engagement, maintains the two C-shaped frame members and the cooperating rigidifying bars at the opposite ends thereof as an assembled and unitary structural combination. Additionally, and because of the overlapping configuration of the rigidifying bars with respect to the abutting ends of the C-shaped frames and the coaction of the wrapped periphery of the mesh with respect to the outwardly extending channel frame lip and the rigidifying strips, a reinforcing frame assembly is provided which does not need conventional fasteners such as screws, rivets, weldments, or the like, to hold its components together.

Also, by virtue of the use of a frame section having an outwardly extending lip, it is extremely easy to secure the mesh to the frame sections. Specifically, it is only necessary to bend the edge of the mesh around and under the lip, only a single crease or fold line in the mesh periphery being required. A further advantage of the reinforcing structure of this invention, particularly the channel-shaped configuration of the C-shaped frame sections, is that the frame is quite strong, and resists distortion when subjected to the force of freshly poured concrete during the mold-filling operation.

It has been a further objective of this invention to eliminate the waste of concrete which normally accompanies the mold-filling operation by virtue of the necessity of pouring excess concrete into the mold such that it can be subsequently leveled to produce a smooth, flat planar front surface. This objective has been accomplished in accordance with certain further principles of this invention by providing a unique spill guard structure surrounding the upper rim or mouth of the mold, and which includes vertical barriers and at least one horizontal surface. The vertical barriers prevent excess concrete poured into the mold from overflowing the mold rim or mouth and being wasted, while the horizontal surface permits excess concrete screed from the mold during the leveling process to be temporarily stored until the next mold-filling operation wherein such temporarily stored concrete constituting the excess from the last mold-filling operation is scraped off the surface into the next mold. In practice it has been found that a spill guard constructed as described virtually eliminates concrete waste as an incident to filling molds.

In accordance with a further aspect of this invention designed to promote efficiency in panel fabrication, the mold is transported to the mold-filling station on an assembly line conveyor whereat it is supported on a vibratable conveyor section of said assembly line conveyor. Upon conclusion of the mold-filling operation, the conveyor section upon which the filled mold is supported is vibrated and the concrete therein densified. By virtue of supporting the mold at the filling station on a conveyor section which both constitutes a section of an overall assembly conveyor line, as well as a conveyor section which is vibratable, the normal flow of molds on the assembly conveyor line can continue uninterrupted, that is, without removal of the molds at the filling station for placement on a special vibrator mechanism.

The foregoing and other advantages and objectives of the invention will become more readily apparent from a detailed description of the drawings in which.

Figures 1, 2:
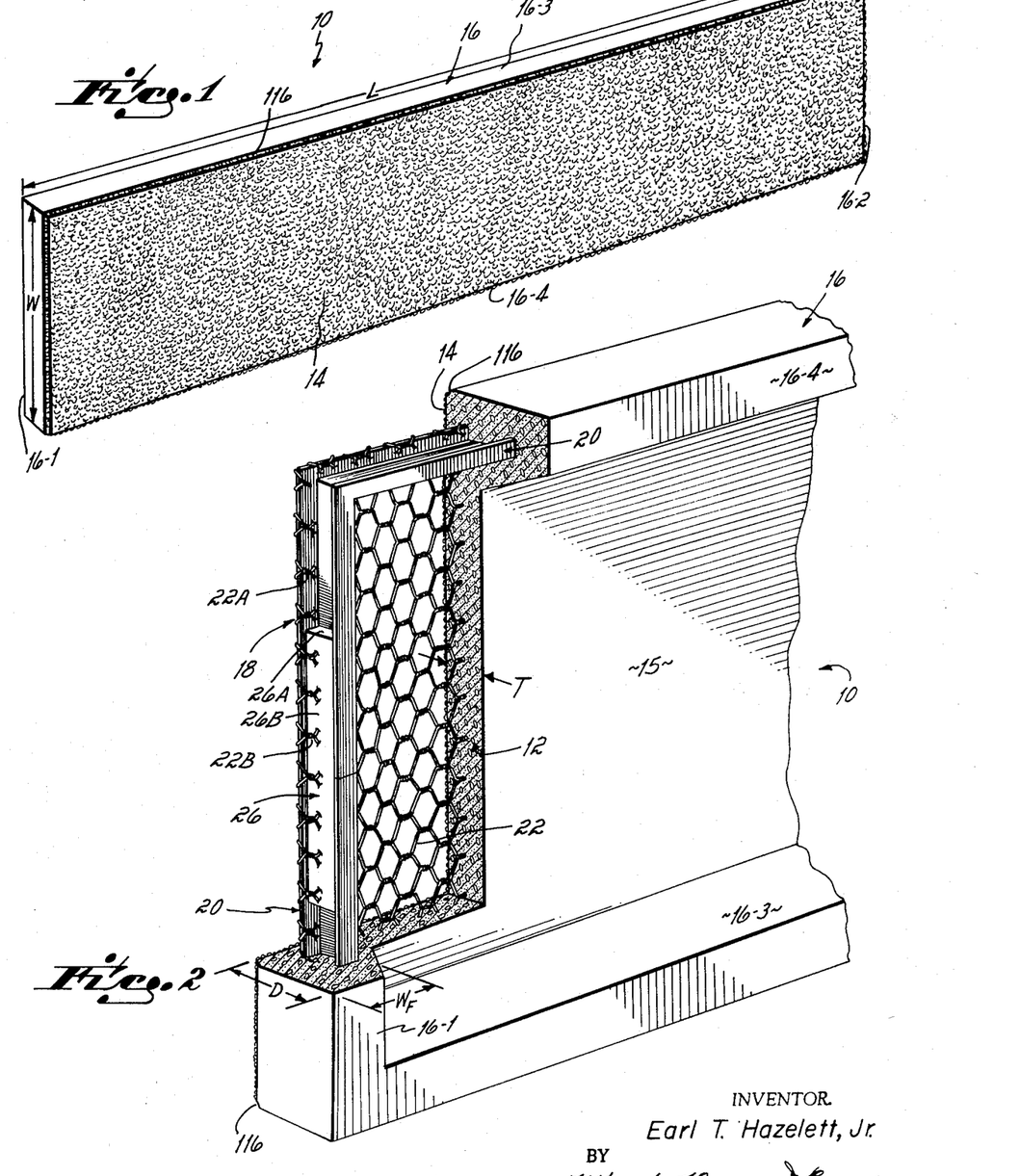
FIG. 1 is a perspective view of a panel constructed in accordance with certain of the principles of this invention, showing the front thereof.
FIG. 2 is a perspective view, partially cut-away, of the panel of FIG. 1, showing a portion of the rear and end sections thereof.

With reference to FIGS. 1 and 2, the panel 10 of this invention, which preferably is rectangular in shape, is seen to include a rectangular central section 12 having a front surface, or face 14 and a rear, or back, surface 15. The front surface 14 of the panel, if desired, may be provided with a decorative finish, such as embedded gravel or stones. Integral with the perimeter of the central panel section 12 and extending rearwardly is a flange 16 having opposite ends 16-1 and 16-2 and opposite sides 16-3 and 16-4. The cross section or profile of the flange 16 preferably is tapered to permit easy removal of the panel 10 from a mold in a manner to be described hereafter. Embedded within the panel 10 is a reinforcing structure 18, a detailed description of which is provided hereinafter.

As will be understood by those skilled in the art, the dimensions of the panel 10, the overall length L, width W and thickness T of the central section 12, as well as the flange width $W_F$ and depth D measured parallel and perpendicular to the rear surface 15, can be varied depending upon the desires of the user and the structural strength requirements of the particular application for which the panel is designed. Very satisfactory panels for use as fencing enclosures for residential home walls, patios, gardens, and the like have been fabricated which have overall dimensions of 2 feet in width and 10 feet in length with the thickness of the central section being five-eighths to three-fourths inch, and the flange width and depth each measuring approximately 2–3 inches. Of course, each of these panel dimensions may be varied in accordance with well-known relationships correlating structural strength and size. Additionally, while rectangular panels are most convenient to use, the panels need not be rectangular, but may be formed in other suitable or desired shapes such as circular, triangular, hexagonal, etc.

The reinforcing structure 18, with reference particularly to FIGS. 2, 4, 5, and 6, includes two identical C-shaped frame sections 20,20 positioned opposite to each other, forming a rectangle which is embedded in the panel flange 16. Each frame section 20,20 consists of opposite parallel end sections 20A and 20B integrally connected to a central or intermediate section 20C. The frame sections 20,20 are fabricated of channel stock having upper and lower parallel lips 20D and 20E respectively integrally connected to the upper and lower edges of a central web 20F. The channel stock from which the frame members 20,20 are constructed can be fabricated of a variety of commercially available materials and different dimensions. For a panel having the preferred dimensions noted earlier, frame sections 20,20 are preferably fabricated of 16 gauge steel having a lip width of one-half inch and a web height of 1½ inch.

Figures 4, 5, 6:
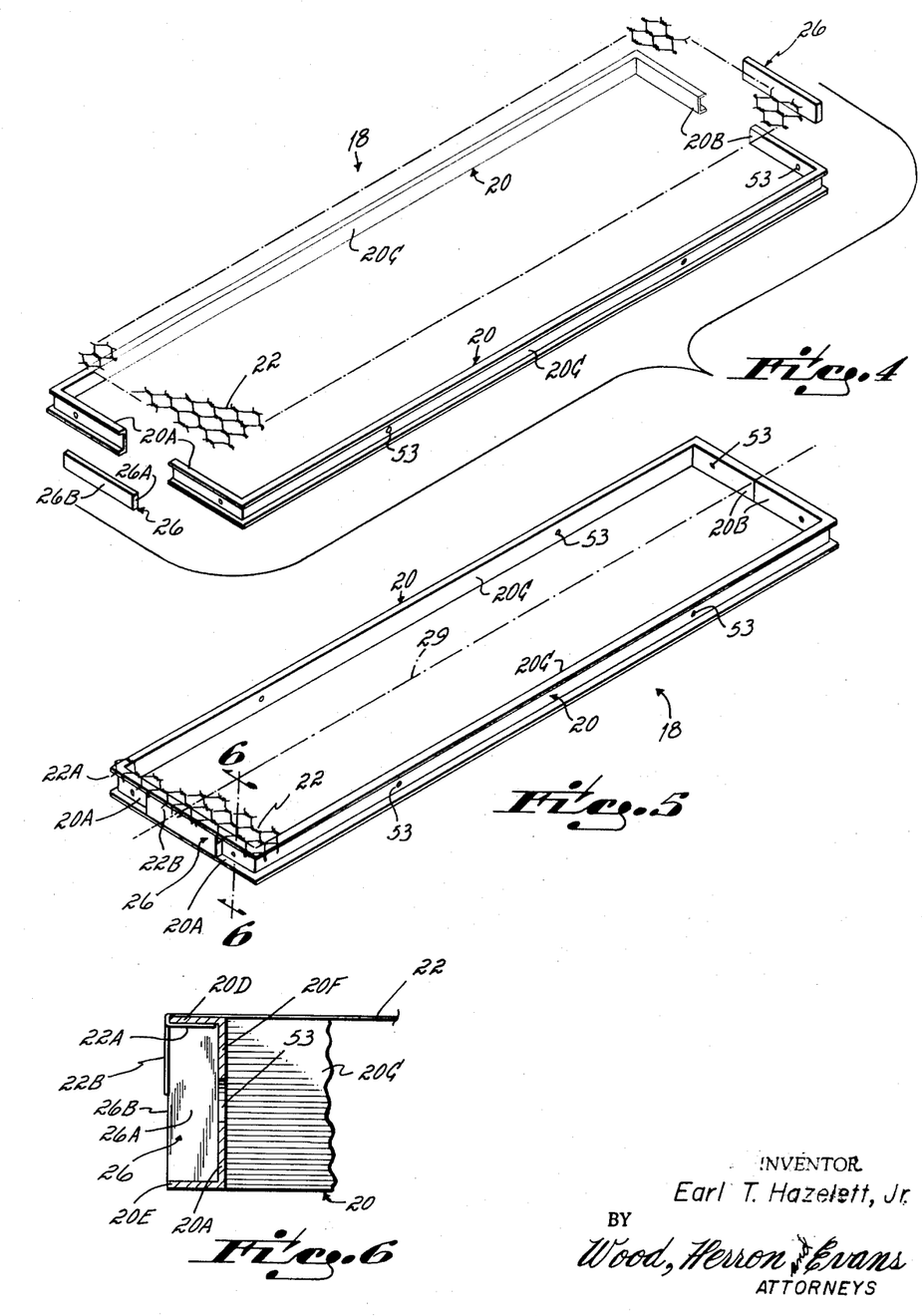
FIG. 4 is a perspective view, in exploded format, of the reinforcing members of the panel of this invention prior to assembly thereof.
FIG. 5 is a perspective view of the panel reinforcing members as assembled.
FIG. 6 is a cross-sectional view taken along line 6—6 of FIG. 5.

The reinforcing structure 18 also includes reinforcing mesh or screen 22 secured to the upper lip 20D of the reinforcing members 20,20 in a manner to be described. The reinforcing mesh 22, like the frame members 20,20 are capable of fabrication from a variety of materials, but preferably are fabricated of commercially available "stucco netting" having a wire diameter of 17 gauge and a mesh size of 1½ inch.

Also forming part of the reinforcing structure 18 and serving to rigidify the frame sections 20,20 are rigidifying strips 26,26 of identical construction located at opposite ends of the reinforcing structure. The rigidifying bars or strips 26,26 are preferably fabricated of steel bar stock of rectangular cross section. The dimensions of the bars 26,26 are not critical; preferably the bars have a cross-sectional height slightly less than the spacing of the upper and lower lips 20D and 20E of the frame sections 20,20 and a cross-sectional width approximately equal to the depth of the channel frames, that is, the extent to which the lips 20D and 20E project outwardly from the web 20F. With the height and width of the rigidifying strips 26,26 so dimensioned they conveniently and snugly fit within the channel formed by lips 20D and 20E and web 20F in a manner to be described. The length of the rigidifying strips 26,26 is not critical, and may be of any desired size depending upon the degree of rigidity desired for the frames 20,20 when the bars are positioned in the channel formed by lips 20D and 20E and web 20F, as shown for example in FIGS. 5 and 6.

In operation, the reinforcing structure 18 is formed by placing identically configured frame sections 20,20 in opposed relationship with their opposite free ends in abutting contact to form an open rectangle, and their upper and lower channel lips 20D and 20E lying in substantially the same upper and lower planes, respectively. With the channel sections 20,20 so positioned, the regidifying strips 26,26 are engaged at opposite ends of the assembled frame sections in the channels formed by the lips 20D and 20E and the web 20F. The strips 26,26 are positioned such that their midpoints lie approximately opposite the point at which the ends of the frame sections 20,20 contact each other. With the rigidifying strips 26,26 engaged in the channels of the opposite ends of the assembled frame sections 20,20, the mesh 22, which is rectangular and slightly larger than the exterior dimensions of the rectangular frame 20,20, is positioned on top of the frame resting on the upper lip 20D of each section. The edge of the mesh is now bent around the upper lip 20D to underlie the lip in those areas where the channel is not engaged with the rigidifying bar 26 and to overlie the rigidifying strip 26 in those areas where the rigidifying strip is present. The mesh 22 when wrapped as indicated secures the C-shaped frame sections 20,20 and the rigidifying strips 26,26 in assembled, unitary configuration. The rigidifying strips 26,26 are restrained against axial movement in either direction by those portions 22A of the bent mesh 22 underlying the upper lip 20D proximate the end 26A of the rigidifying strip 26, and are restrained against motion perpendicular to the web 20F by those portions 22B of the bent mesh 22 which overlie the outer face 26B of the rigidifying strip. The rigidifying strips 26,26 function to prevent bending of the assembled rectangular reinforcing frame 18,18 about an imaginary axis 29 parallel to imtermediate channel sections 20C passing through the point at which the ends 20A,20A and 20B,20B contact each other.

The reinforcing structure 18 by virtue of its unique combination of elements is characterized by having very desirable strength characteristics per unit weight of reinforcing material used. Additionally, the reinforcing structure 18 is dimensionally stable and does not twist or warp when inserted in a mold and covered with concrete. Reinforcing structure 18 admits of rapid assembly inasmuch as fasteners or weldments are not required. The various components of the reinforcing structure 18 remains operatively positioned with respect to each other prior and during the concrete pouring process by action of the wrapped edges 22A and 22B of the mesh 22.

In certain instances where the flanged panel 10 need not have substantial strength, it may be desirable to eliminate the reinforcing structure 18.

A preferred mold useful in forming the flanged panel 10 of this invention is depicted in FIGS. 7, 14, 17 and 18. The mold 30 includes opposite outer end walls 31 and 32 and opposite outer side walls 33 and 34 which are vertically disposed and interconnected to form an outer rectangular walled enclosure. Positioned within and spaced from the outer end walls 31 and 32 and the outer side walls 33 and 34 are inner end walls 35 and 36 and inner side walls 37 and 38 which, like walls 31–34, are interconnected to form an inner rectangular walled enclosure. Interconnecting the lower edges of the outer walled enclosure formed by sections 31-34 and the lower edges of the inner walled enclosure formed by sections 35–38, is a rectangular bottom consisting of interconnected bottom sections 39, 40, 41 and 42, respectively. Walled enclosures 31–34 and 35-38 in combination with bottom sections 39–42 which interconnect them form a rectangular mold cavity which facilitates forming the flange 16 of the panel 10.

Figure 7:
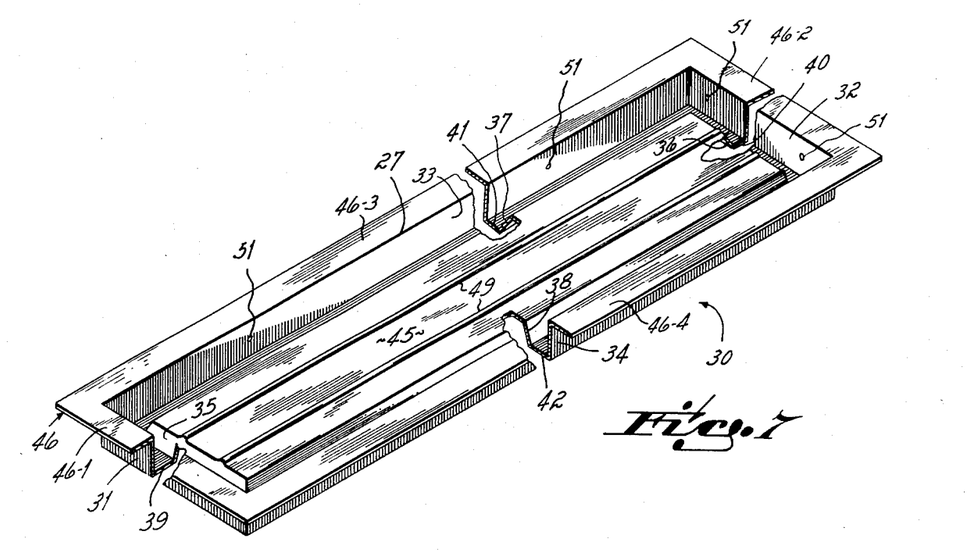
FIG. 7 is a perspective view of a preferred mold or form utilized in the fabrication of the panel of this invention.

A rectangular, central, substantially planar mold section 45 is fixedly secured at its periphery to the upper edges of the inner end and inner side walls 35, 36, 37 and 38. The central mold section 45, in connection with the upper portion of inner end and side sections 35–38, defines a molding cavity for the central section 12 of the flanged panel 10.

The upper edges of the outer end and side wall sections 31, 32, 33 and 34 in effect constitute the rim or mouth 27 of the mold. Integrally connected to the rim-defining upper edge 27 of sections 31, 32, 33 and 34 is a continuous rectangular margin or flange 46 divided into end sections 46-1 and 46-2 and side sections 46-3 and 46-4. The margin 46 of the mold lies in a plane substantially parallel to the plane of the central mold section 45.

Figure 17:
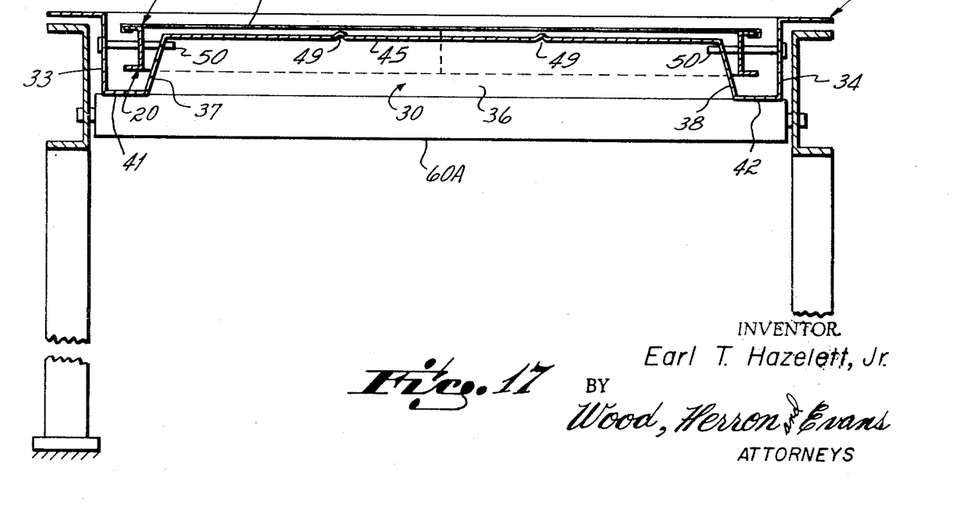
FIG. 17 is a diagrammatic cross section of a mold supported on the conveyor with the reinforcing frame properly positioned within the mold by retaining pins.

The central mold section 45 is preferably corrugated or creased along its length as shown best in FIG. 17 by reference numerals 49. Corrugations 49 perform the dual function of imparting a predetermined degree of structural rigidity to the mold section 45 with a minimum thickness of material. Additionally, the corrugations 49 space the mesh 22 of the reinforcing structure 18 from the central mold section 45 which forms the rear surface 16 of the panel 10. This spacing insures that the mesh 22 becomes fully embedded in the central section 12 of the panel when the mold is filled with concrete.

The upper edges of the outer wall sections 31, 32, 33 and 34, which as noted constitute the rim 27 of the mold 30, lie in a plane coincident with and in fact establishes the front surface 14 of the panel 10 formed in the mold. Preferably the outer wall sections 31, 32, 33 and 34 are disposed perpendicularly to the plane containing the mold rim 27. This insures that the exterior end and side surfaces 16-1 to 16-4 of the panel flange 16 are perpendicular to the front or face 14 of a formed panel 10. Preferably the inner wall sections 37, 38, 39 and 40 slope inwardly and upwardly. When so sloped, the flange-forming mold cavity defined in part by wall sections 35–38 will impart a taper to the flange 16 of the panel 10. The taper permits a panel formed in the mold to be easily removed therefrom.

As will be understood by those skilled in the art, the height of the rim 27 above the plane of the central mold section 45 defines the thickness $T_c$ of the central section 12 of the panel 10. Likewise, the height of the outer wall sections 31–34 above the bottom sections 39–42 defines the depth D of the flange 16, while the horizontal spacing of the outer and inner wall sections 31–34 and 35–38 define the width $W_F$ of the flange 16. These dimensions, as noted, can be varied depending upon the dimensional configuration desired for the molded panel 10, which in turn depends upon the structural requirement of the application for which the panel is used.

To assist in properly locating the reinforcing structure 18 within the mold 30, a plurality of retaining pins 50 are employed. The pins 50 pass through apertures 51 formed in outer mold wall sections 31–34 and apertures 52 formed in inner mold wall sections 35–38. Pins 50 also pass through holes 53 formed in the web sections 20F of the channel-shaped frame members 20,20. The relative orientation of the holes 51 and 52 in the mold walls 31–34 and 35–38 and the holes 53 in the frame sections 20,20 is selected such that the rectangular frame 20,20 is centrally positioned within the flange-forming cavity of the mold and the mesh 22 is centrally positioned within the central section-forming cavity of the mold.

Significantly, since associated end sections 20A, 20A and 20B, 20B of reinforcing frames 20,20 do not overlap, but rather abut, the pins 50 which pass through the reinforcing frame sections do not have to pass through more than one thickness of a frame section. Thus, there is no problem of aligning two holes of overlapping frame members with a single pin which would result were ends 20A,20A (or 20B,20B) lapped in the region of holes 53. For the same reason that the abutting ends 20A, 20A and 20B, 20B do not overlap, namely, to avoid alignment of a pin 50 with two holes of the frame, reinforcing strips 26,26 are selected such as to be shorter than the distance between holes 53 in abutting end sections 20A, 20A, and 20B, 20B.

Figure 3:
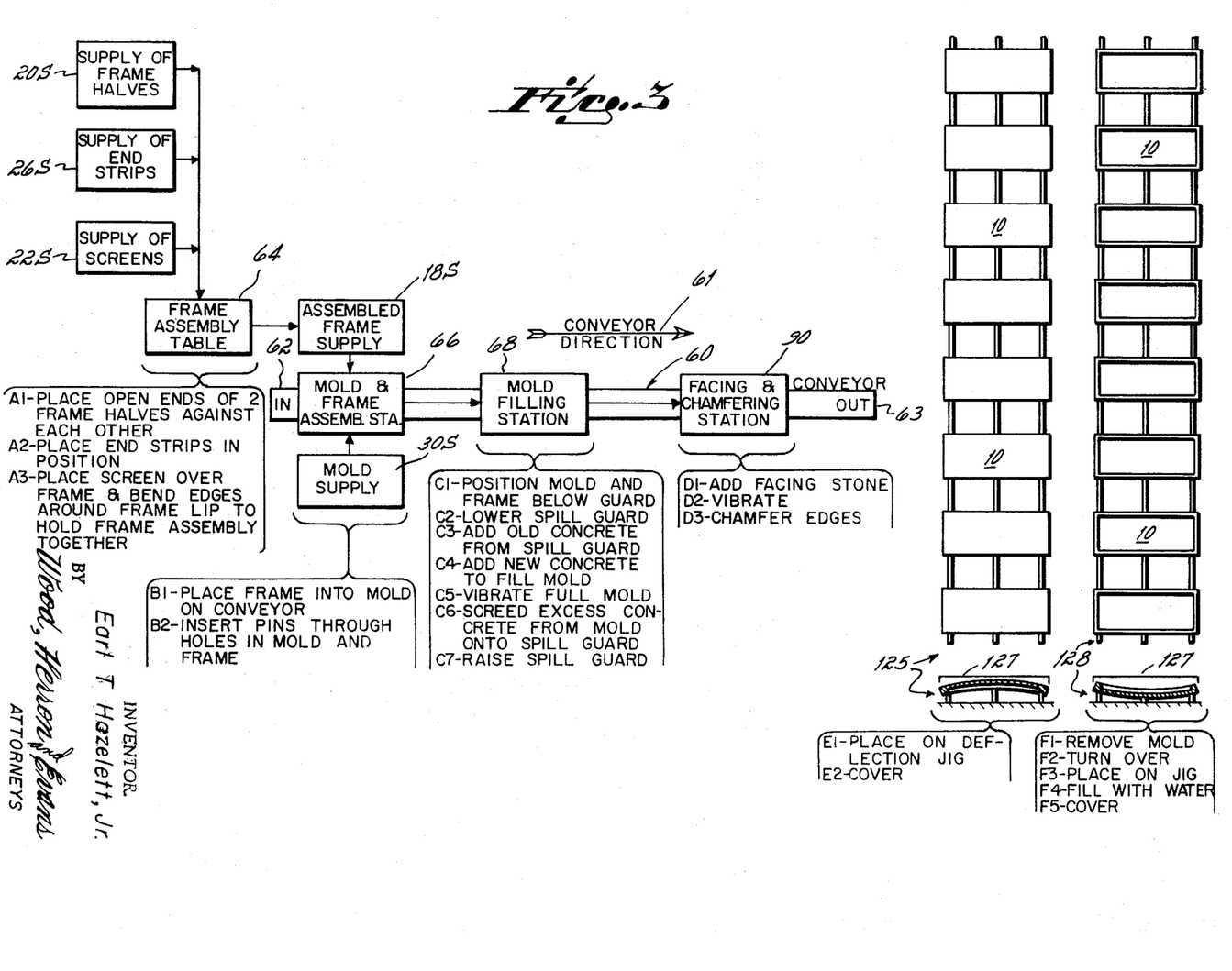
FIG. 3 is a schematic plan view of a production line for fabricating the panel of this invention.

A preferred assembly line layout for fabricating the reinforced flanged concrete panels of this invention is schematically depicted in FIG. 3. The preferred arrangement includes a conveyor 60 which moves in the direction of arrow 61 and has an input end 62 and an output end 63. The conveyor may be of any suitable type and preferably is a conveyor having spaced parallel rollers 60A (FIGS. 17 and 18) rotatable about a horizontal axis. Located on opposite sides of the input end 62 of the conveyor 60 are a supply 30S of molds 30 and a supply 18S of assembled reinforcing frame structures 18. Associated with the supply 18S of assembled reinforcing frames 18 is a proximately located table or platform 64 upon which the frame sections 20, reinforcing strips 26, and mesh 22 obtained from frame, strip and mesh supplies 20S, 26S and 22S are suitably assembled into a unitary reinforcing structure of the type depicted in FIG. 5. The conveyor section adjacent the input end 62 and located between the mold and reinforcing frame supplies 30S and 18S constitutes a mold and frame assembly station 66. At station 66 a mold 30 from the supply 30S is, after placement upon the conveyor, provided with an assembled frame 18 from the supply 18S, which frame is properly positioned within the mold by the placement of pins 50 in mold apertures 51 and 52 and frame apertures 53, as shown in FIG. 17.

Located downstream from the mold and frame assembly station 66 is a mold filling station 68. Filling station 68, considered in more detail with respect to FIG. 18, includes a horizontal roller conveyor section 69 which is physically separate from conveyor sections 70 and 71 located on either side thereof. Associated with conveyor section 69 is a vibrator mechanism 72 mounted by supports 72A for producing vibratory motion of the conveyor section 69 via suitable interconnecting linkages shown schematically by reference numerals 73, for reasons to become apparent hereafter. Positioned at the mold filling station 68 and located above the horizontal conveyor section 69 is a concrete delivery means, such as a chute, indicated schematically by reference numeral 75, the purpose of which is to provide a convenient source of concrete for filling a mold 30 positioned on the conveyor section 69 beneath the chute 75 at mold filling station 68.

Figure 18:
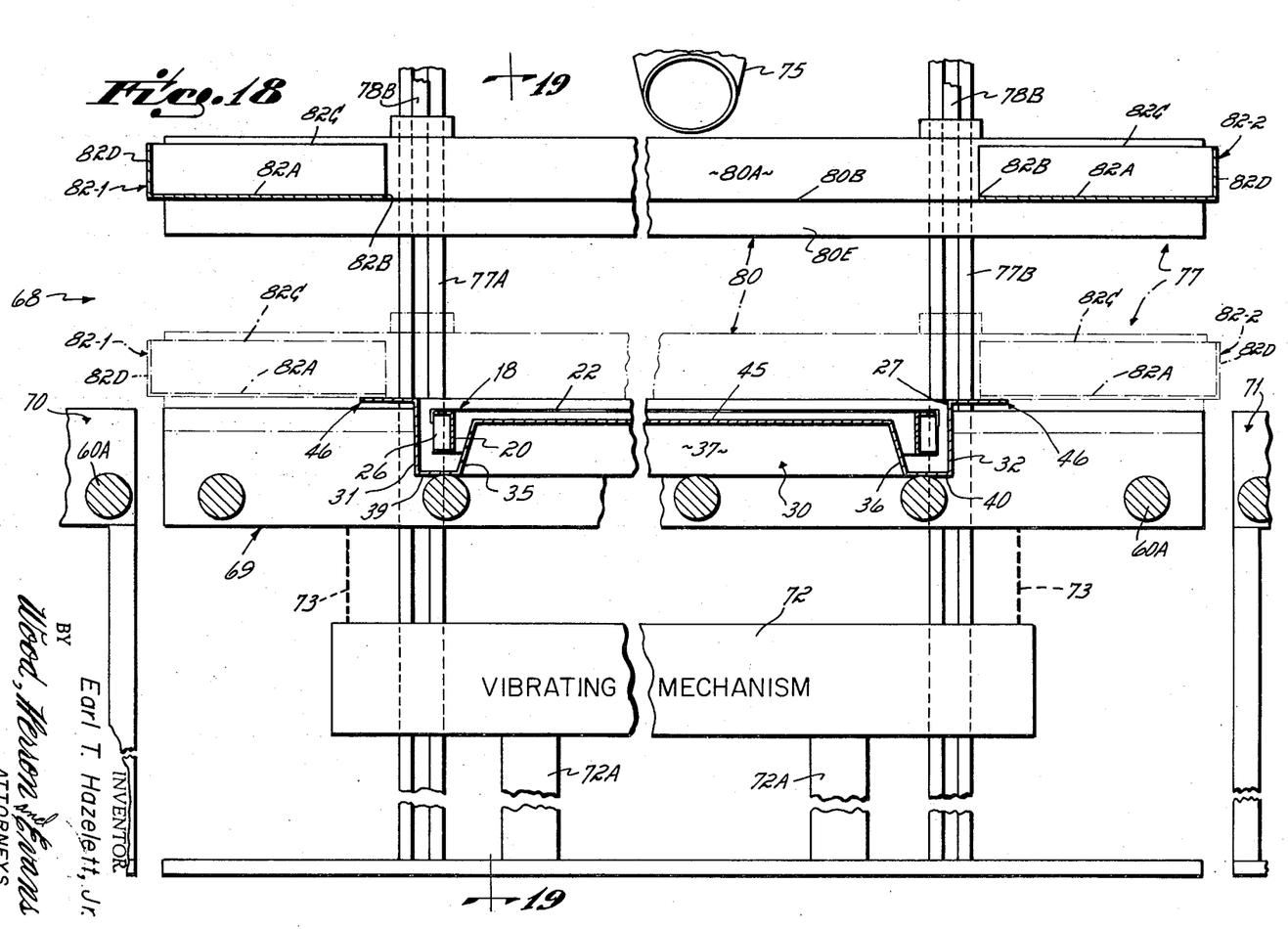
FIG. 18 is a diagrammatic longitudinal cross-sectional view of a mold supported on a vibratable conveyor section at the mold-filling station, showing the spill guard in solid lines in its upper disengaged position and in phantom lines in its lower engaged position.
Figures 19, 20A, 21B:
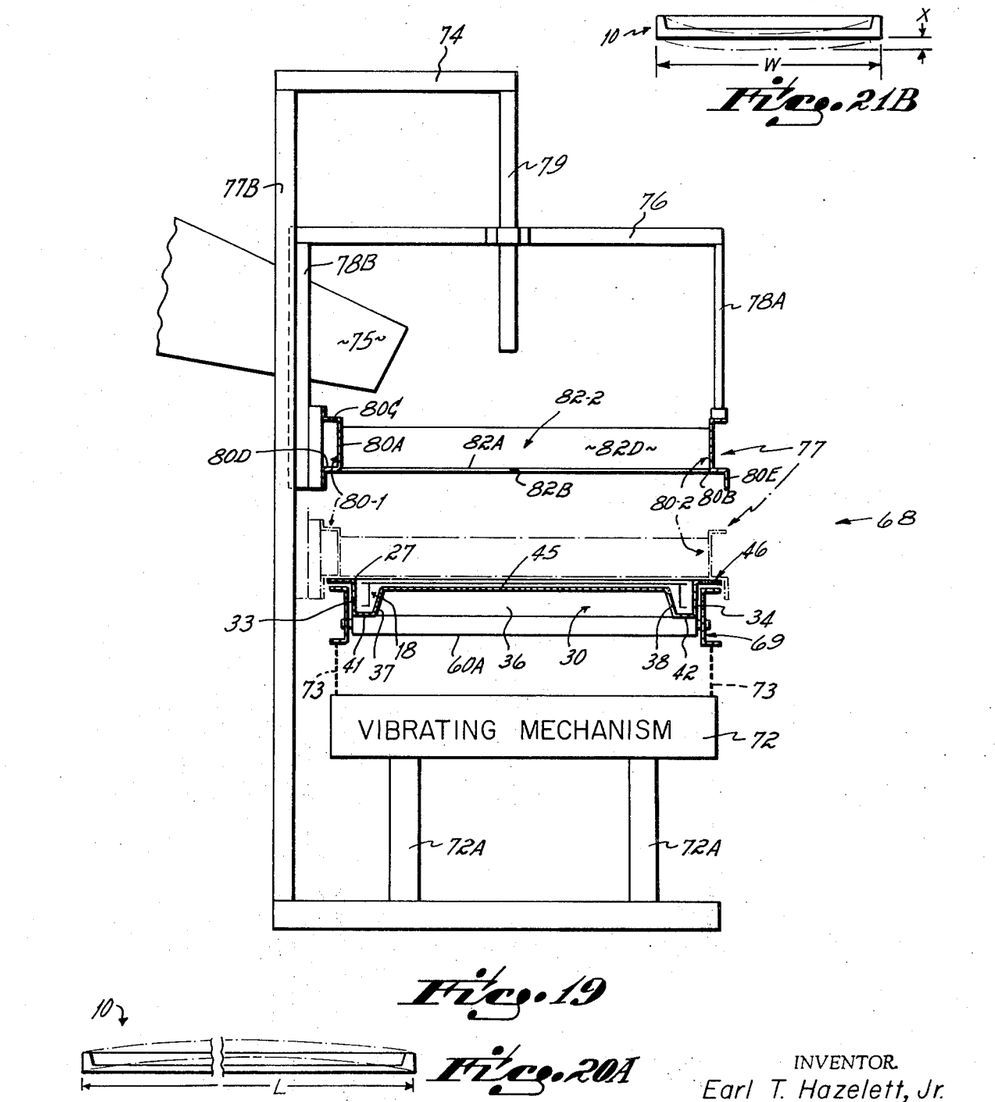
FIG. 19 is a diagrammatic transverse cross-sectional view taken along line 19—19 of FIG. 18.
FIG. 20A is a diagrammatic cross section of a panel along the length thereof showing the normal shrinkage deformation in phantom lines and the desired shape in solid lines.
FIG. 21B is a diagrammatic cross section of a panel along the width thereof showing, in phantom lines, the panel deflected in a direction countervailing the normal shrinkage direction; and showing in solid lines the desired panel shape.

Also located at the mold filling station 68 is a spill guard 77 which is vertically movable on stationary spaced supports 77A and 77B between an inoperative upper position shown in solid lines and an operative lower position as shown in phantom lines in engagement with the margin 46 of an underlying mold 30. To strengthen the slidable support of the spill guard 77 on spaced vertical supports 77A and 77B, the spill guard is provided with a horizontal brace 76 fixed to the sides 80-1 and 80-2 thereof by vertical braces 78A and 78B (FIG. 19). The horizontal brace 76 slides on a vertical guide member 79 stationarily mounted to spaced vertical supports 77A and 77B by a horizontal bracket 74. The spill guard 77 contains excess concrete poured into the mold from chute 75, facilitates rapid screeding, or leveling, of the concrete freshly poured into the mold, and permits the retention of excess concrete screeded from the mold during the leveling process for subsequent use in partially filling the next, or successive, mold introduced to the mold filling station 68.

Figure 8:
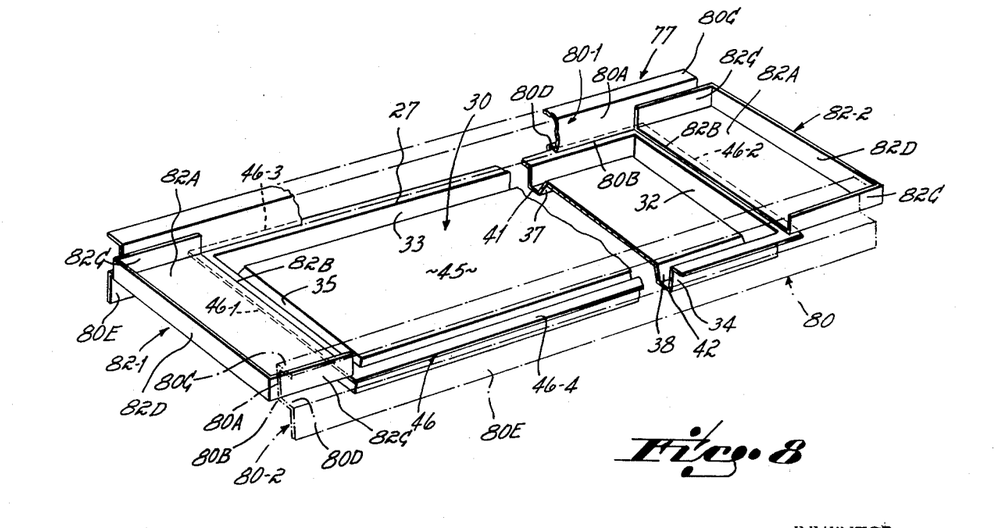
FIG. 8 is a perspective view of a spill guard utilized in conjunction with the mold filling operation.

The spill guard 77, as best shown in FIG. 8 in its lower position engaged with the margin 46 of a mold 30, includes opposite side sections 80-1 and 80-2 and opposite end sections 82-1 and 82-2 which are rigidly interconnected in a manner and for a purpose to become apparent hereafter. The side sections 80-1 and 80-2, which are identical, each include a vertical side wall 80A terminating in a lower edge 80B. The lower edges 80B of side walls 80A, when the spill guard 77 is operatively engaged with an underlying mold 30, are adapted to seat on the margin side sections 46-3 and 46-4 at a point spaced outwardly from the upper edges of the mold sides 33 and 34 which partially define rim 27. If desired, the upper edge of the vertical walls 80A may be provided with outwardly extending lips or flanges 80C for structural rigidity. Likewise, the lower edges 80B of vertical walls 80A may be provided with outwardly extending lips or flanges 80D which at their outer edge have downwardly depending lips or flanges 80E. Assuming horizontal flanges 80D, 80D are provided, they should extend outwardly sufficiently such that the depending lips 80E, 80E pass outwardly of the outer edges of side margin sections 46-3 and 46-4. With the depending lips 80E, 80E so positioned, the edges 80B, 80B can seat on the margin sections 46-3 and 46-4. However, the downwardly depending lips 80E, 80E should not be spaced too far apart, otherwise undesirable relative movement will occur between the edges 80B, 80B of side walls 80A, 80A and the upper edges of the mold side sections 33 and 34 which partially define rim 27.

End sections 81-1 and 82-2 of the spill guard 77, which are identical, each have a horizontal surface 82A, the lower surface of which lies in the plane of the lower edges 80B, 80B of vertical walls 80A, 80A. With the surface 82A so positioned relative to the edges 80B the inner edges 82B of end sections 82 seat on the margin end sections 46-1 and 46-2 at a point outward from the upper edges of mold end walls 31 and 32 which partially define the rim 27. Preferably spill guard end sections 82-1 and 82-2 are provided with vertical sides 82C, 82C which are secured by weldments or otherwise to the vertical walls 80A of spill guard side sections 80-1 and 80-2, and an outer wall 82D.

At the mold-filling station 68 a yet unfilled mold 30 having a reinforcing structure 18 supported therein by pins 50 is positioned on the conveyor 69 at a point underlying the spill guard 77. Specifically, the mold 30 is positioned beneath the spill guard 77 such that when the spill guard is lowered from its upper inoperative condition to its lower operative position the lower edges 80B of the sides 80-1 and 80-2 and the edges 82B of the end sections 82-1 and 82-2 seat on the margin sections 46-1 to 46-4 outwardly of the mold rim 27 defined by the upper edges of the outer mold wall sections 31-34, thereby not interfering with the free flow of concrete into the mold from the chute 75.

Figure 9:
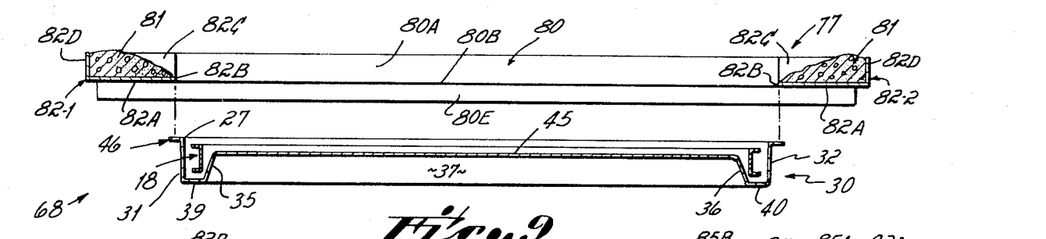
FIG. 9 is a diagrammatic view in cross section showing the relationship of the spill guard and the mold (with reinforcing frame contained therein) prior to engagement of the spill guard with the upper rim or mouth of the mold.

Once the mold 30 at the mold-filling station 68 is properly oriented below the elevated spill guard 77 as shown for example in FIG. 9, the spill guard is lowered from its upper inactive position to its lower active position depicted in FIG. 9. Excess concrete 81 which had been screeded from a mold during a previous mold-filling operation and which is temporarily stored on the end sections 82-1, 82-2 of the spill guard 77 is now drawn into the underlying mold by a screeding tool 85 which has a rectangular elongated planar wiping blade 85A secured to the end of a handle 85B. The horizontal dimension or length of the wiping blade 85A is slightly greater than the width W of the mold as defined by the perpendicular distance between side walls 33 and 34, but less than the spacing between walls 80A, 80A of sides 80-1 and 80-2.

With the wiping blade 85A of the screeding tool 85 having the length indicated, it can be positioned between the walls 80A, 80A of side members 80-1 and 80-2 with its bottom edge supported at the opposite ends thereof by the upper edges of walls 33 and 34 which partially define rim 27. When so positioned, the blade 85A can be drawn the length of the mold and spill guard to (a) deposit in the mold excess concrete 81 from the last mold filling located on surfaces 82B of the spill guard, and (b) to level the mold and deposit excess concrete on surfaces 82B.

Figure 10:
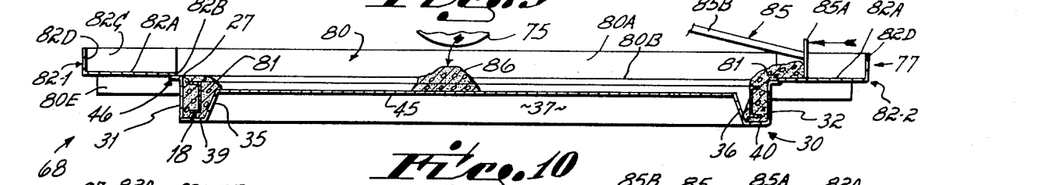
FIG. 10 is a diagrammatic view in cross section of the spill guard and mold with contained reinforcing frame, at the initiation of the mold-filling operation.
Figures 11, 12:
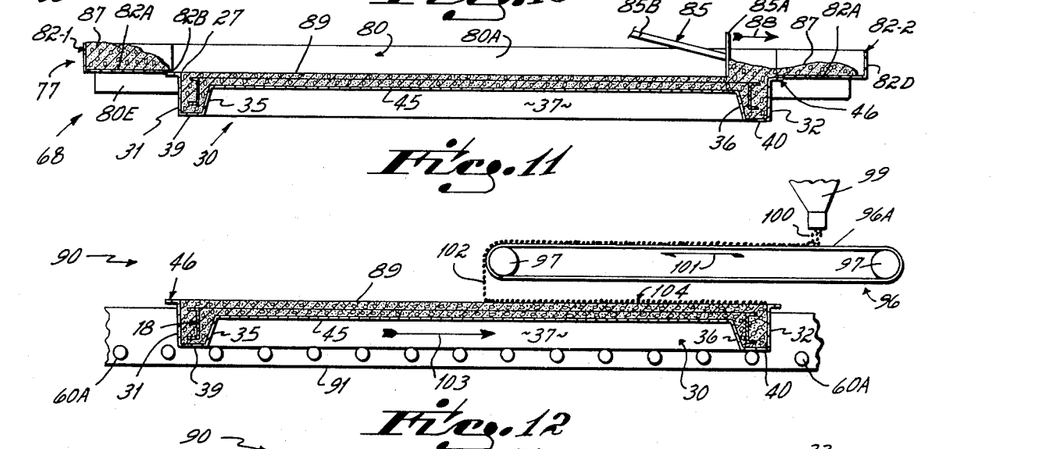
FIG. 11 is a diagrammatic view in cross section of the spill guard and mold with contained reinforcing frame, subsequent to the filling operation, and in the process of screeding excess concrete from the top surface thereof.
FIG. 12 is a diagrammatic view in cross section of the filled mold supported on a conveyor and passing beneath apparatus which deposits ornamental gravel or stone on the panel face or front surface.

In addition to depositing in the mold 30 the excess concrete 81 from a previous mold filling operation, concrete 86 from the chute 75 disposed above the mold is deposited into the mold as shown in FIG. 10. When the mold has been filled, the upper surface thereof is leveled by movement of the screed blade 85A across the rim 27 of the mold 30, as shown in FIG. 11 by arrow 88. Excess concrete 87 is transferred from the mold to the end sections 82-1 and 82-2 of the spill guard 77. The excess concrete 87 now stored in the end sections 82-1 and 82-2 of the spill guard 77, in the manner similar to that previously described in connection with FIG. 10, will be used to partially fill the next mold.

The use of the spill guard 77 prevents waste of concrete. Excess concrete poured into the mold cannot overflow over mold side walls 33 and 34, and thereby be wasted, by virtue of vertical walls or barriers 80A of spill guard sections 80-1 and 80-2. Nor can excess concrete deposited in the mold overflow over mold end walls 31 and 32 and thereby be wasted; this overflow is salvaged by end sections 82-1 and 82-2. Finally, excess concrete which has been deposited in the mold and which perhaps has just built up in the center above the plane of the mold rim 27 and which would not necessarily overflow over mold walls 31-34 can be salvaged for the next mold-filling operation when the mold is leveled by virtue of end section 82 onto which such excess concrete can be deposited by screeding tool 85 in the course of the mold leveling operation.

Prior to the mold leveling operation by screeding tool 85, and/or subsequent thereto, the conveyor section 69 at mold-filling station 68 is vibrated by vibrating mechanism 72 for the purpose of densifying the concrete deposited in the mold supported thereon. Additional concrete from the chute 75 may be added to the mold 30 should the vibration and resultant densification of the concrete therein cause the upper surface 89 of the concrete to fall below the plane of the mold rim 27. In the event that vibration and consequent densification cause the level of the concrete 89 to fall below the mold rim 27, additional concrete from the chute 75 is added and the screeding operation repeated.

Figure 13:
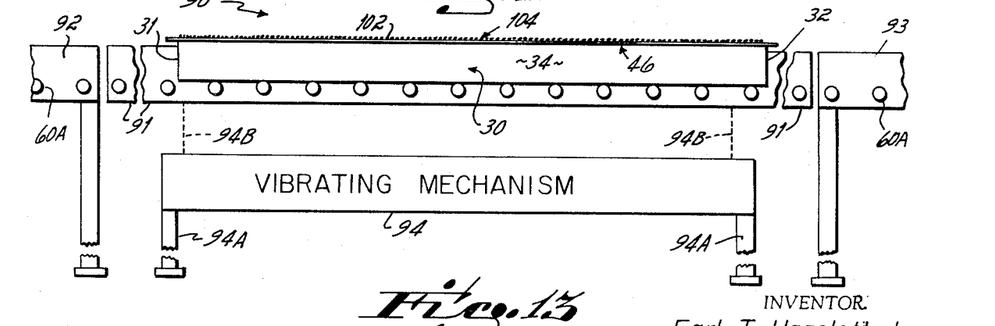
FIG. 13 is a diagrammatic elevational view of the filled mold on a conveyor section in the process of being vibrated to embed the ornamental material in the front surface or face of the panel.

After the mold has been filled, densified by vibration of the conveyor section 69 and leveled with screeding tool 85, the spill guard 77 is elevated and the mold moved on the conveyor 60 from mold filling-station 68 to a facing station 90 depicted in FIGS. 3, 12 and 13. At station 90 decorative facing stone, gravel or other suitable material is applied to the leveled upper surface 89 of the concrete which ultimately constitutes the front surface 14 of the panel 10. The facing station 90 includes a conveyor section 91, preferably of the roller type, which is mounted independently of adjacent conveyor sections 92 and 93 of conveyor 60, permitting conveyor section 91 to be vibrated by a vibrating mechanism 94 supported on legs 94A. The vibrator mechanism 94 is appropriately interconnected with the vibratable conveyor section 91 via suitable connecting members indicated schematically by reference numerals 94B.

Positioned above the conveyor section 91 is an endless belt 96 trained over spaced parallel rolls 97 rotatable about horizontal axes. The width of the belt 96, that is, its dimension parallel to the axes of rolls 97, is such that it is substantially coextensive with the width W of the exposed upper surface 89 of the formed concrete panel 10 which partially underlies it as shown in FIG. 12. Cooperating with the belt 96 is a source 99 of facing stone 100. Facing stone 100 from the source 99 is selectively deposited on the upper reach 96A of the belt 96.

When the belt reach 96A moves in the direction of arrow 101, facing stones 102 are deposited from the upper belt reach 96A onto the upper surface 89 of the underlying concrete panel 10. To facilitate depositing stones 102 on the upper exposed surface 89 of the panel 10 in a layer 104 of uniform thickness the mold 30 moves in the direction of arrow 103 at a uniform rate. Assuming the speed of the belt reach 96A and the rate of deposit of stones 102 thereon is maintained constant, movement of the mold 30 in the direction of arrow 103 at a uniform speed will provide a layer 104 of facing stones 102 on the upper surface 89 of the formed panel 10 which is substantially uniform in thickness. During and/or after the deposit of the facing stones 102 on the upper exposed surface 89 of the panel 10 at the facing station 90, the vibratable conveyor section 91 upon which the mold 30 is located is vibrated through connecting elements 94B by vibrating means 94. Vibration of the conveyor section 91 and mold 30 supported thereon partially embeds the stones 102 in the upper exposed surface 89 of the formed panel 10, anchoring the stones therein. To insure proper coverage of the panel surface 89 with stones 102, it is preferable to place stones on the panel in excess of that actually required. The excess stones will not adhere to the concrete surface 89, and hence are easily removed.

Subsequent to vibration of conveyor section 91 and the consequent embedding of the stones 102 in the exposed surface 89 of the panel 10 at the facing station 90, the peripheral edges of the upper mold surface 89 are chamfered. Chamfering is accomplished, as shown best in FIG. 14, by means of a novel chamfering tool 108. Chamfering tool 108 includes a cylindrical drum 109 mounted for rotation by means of a pin 110 which at one end is concentrically anchored in the drum 109 and at the other end rotatably journalled in the end of a handle 111. Secured to the outer end of the drum 109 is a frusto-conical drum section 112 having an inner peripheral end region which, with respect to the surface of the drum 109, forms a shoulder 113.

Figure 14:
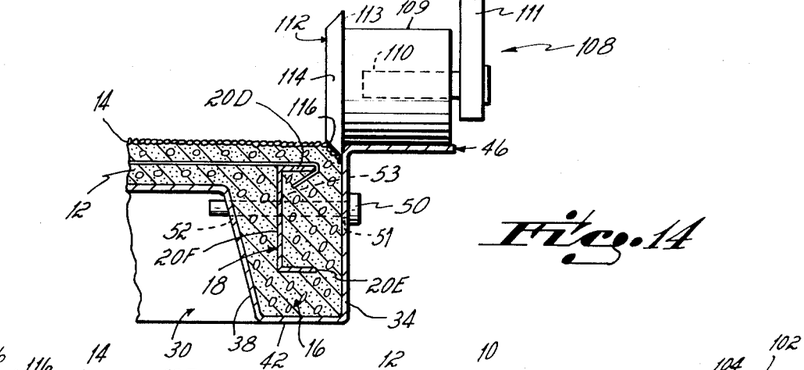
FIG. 14 is a cross-sectional view partially in elevation of a chamfering roll engaged with the rim of a filled mold for chamfering the edge of the front surface or face of the panel.

Chamfering of the perimeter of the stone faced surface 89 of the panel 10 is accomplished by engaging the peripheral surface of the drum 109 and the margin 46 of the mold 30, with the shoulder 113 abutting the rim 27 of the mold. The drum 109 is then rolled lengthwise along the mold margin 46 maintaining the shoulder 113 in engagement with the mold rim. Frusto-conical surface 114 engages the edge of the stone faced upper surface 89 of the panel 10, producing a chamfered edge 116. By virtue of the existence of the embedded stone layer 104 between the frusto-conical surface 114 and the underlying surface 89 of the mold 10, the freshly poured concrete surface 89 does not adhere or stick to the frusto-conical surface 114 of the chamfering tool 108.

Of course, those skilled in the art will understand that it is not essential to face the upper exposed surface 89 of the panel 10 with a layer of decorative stones 104. Accordingly, if it is desired that the panel 10 not be faced with a layer 104 of decorative stones 102, the facing steps may be omitted. Likewise, regardless of whether the surface 89 of the panel 10 is faced with a layer 104 of stones 102, the chamfering step may or may not be included, as desired. If neither facing for chamfering is desired, the entire chamfering and facing station 90 may be omitted.

When the poured panel 10 in mold 30 at the facing station 90 has been faced and chamfered, it is removed from the output end 63 of the conveyor 60. Upon removal of the poured panel 10 in mold 30 from the conveyor end 63, the mold 30 is placed on a support 125 to undergo a partial curing step to be described. The support 125 in a preferred form includes three elongated substantially parallel support rails 125A, 125B and 125C. Outer rails 125A and 125C are spaced apart a distance slightly less than the length L of the poured panel 10 as shown best in FIGS. 3 and 15. The upper surfaces 125A' and 125C' of supports 125A and 125C preferably lie in a common horizontal plane 126. The intermediate support 125B which is disposed substantially equidistant from outer supports 125A and 125C has an upper surface 125C' which is spaced above the horizontal plane 126 of support surfaces 125A' and 125B' by a distance X. With the supports 125A, 125B and 125C so spaced and the support surfaces 125A', 125B' and 125C' so oriented with respect to each other, when a mold 30 filled with a recently poured concrete panel 10 is supported, the mold 30 will deflect under the weight of the concrete in the manner indicated in FIG. 15.

Figure 15:
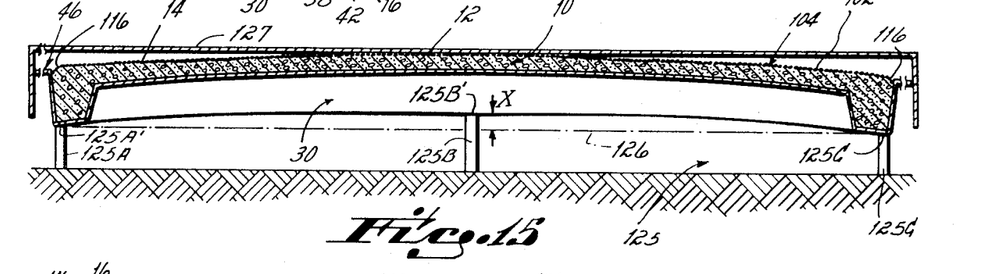
FIG. 15 is a diagrammatic view in cross section of a filled mold during the initial curing phase of the panel, showing the mold deflected under the weight of the contained concrete in a direction countervailing the normal shrinkage deformation direction.
Figure 20B:
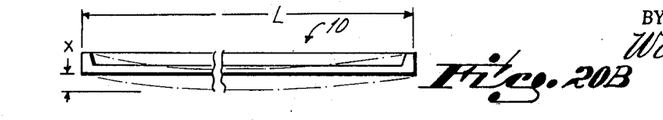
FIG. 20B is a diagrammatic cross section of a panel along the length thereof showing in phantom lines the panel deflected in a direction countervailing the normal shrinkage direction; and showing in solid lines the desired panel shape.
Figure 21A:
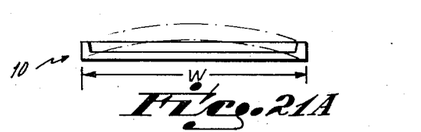
FIG. 21A is a diagrammatic cross section of a panel along the width thereof showing the normal shrinkage deformation in phantom lines and the desired shape in solid lines.

The deflection of the mold 30, which as indicated is produced by the weight of the recently poured concrete contained therein, is designed to cause the panel, upon partial curing in such deflected or deformed position, to assume a deformation countervailing the normal shrinkage deformation of a flanged panel. In practice if a formed panel 10 is allowed to partially cure in an undeflected mold, it will shrink when fully cured and assume a deformed shape along its length L and width W as shown in phantom lines as FIGS. 20(a), 21(a), respectively, rather than be flat as shown in solid lines in these figures. However, with this invention, partial curing of the formed panel 10 in a mold deflected along its length L and width W in a direction countervailing the normal shrinkage deformation, as shown in FIG. 15 and in phantom lines in FIG. 20(b) and as shown in phantom lines in FIG. 21(b), respectively, will cause the panel when fully cured to assume a flat position as shown in solid lines in FIGS. 20(b) and 21(b). Accordingly, the dimension X in FIGS. 15, 20 (b) and 21(b) is selected such that the resulting deformation of the mold 30, and hence the resulting deformation of the panel 10 once it partially cures in such deflected mold, will be in a direction countervailing the normal shrinkage direction such that when the panel subsequently undergoes shrinkage deformation the resultant shape will be that which is desired in the final panel, namely, panel faces 14 and 15 which are flat.

Of course, those skilled in the art will understand that it is possible to obtain the desired deflection of the mold 30 under the weight of the recently poured concrete contained therein by supporting the mold 30 in a manner other than shown in FIG. 15. For example, with appropriate selection of the stiffness of the mold 30 it may be possible to eliminate outer supports 125A and 125C altogether, the mold merely being supported on a central support 125B. With the mold supported on a central support, the ends of the mold would be free to deflect downwardly and assuming the stiffness of the mold was properly chosen the deflection would be controlled such that the required deflection X, no more or no less, would result for a given panel having a predetermined concrete weight.

During the partial curing step when the mold 30 is supported on supports 125A, 125B and 125C, as shown in FIG. 15, the mold is covered with a shallow top 127. The top 127, which may be made of plywood, fiberglass, or other suitable material, loosely engages the exterior edges of the margin 46 of the mold and when so engaged controls the amount of water permitted to evaporate from the recently poured concrete during the partial curing step. With the recently poured concrete panel in the covered and deflected mold position as shown in FIG. 15, and dimensioned in the preferred manner noted earlier, the concrete is permitted to cure for approximately 24 hours at approximately 80°F. The partial curing phase of the panel in the deflected mold may be varied. For example, the partial curing step in the deflected mold may be shortened to 4–6 hours by exposing the panel to steam and/or by the addition of chemical additives which hasten setting of the concrete, such as calcium chlorite and other known compounds utilized to hasten curing.

Following partial curing of the panel in the deflected mold as depicted in FIG. 15 for a period of approximately 24 hours, or for a shorter period if chemical additives are utilized, the cover 127 is removed and the partially cured panel 10 removed from the mold 30. Following removal from the mold, the partially cured panel is inverted from the position shown in FIG. 15. The inverted, partially cured mold 10 is then subject to a second curing step in which it is supported on a support 128 having three elongated spaced parallel support rails 128A, 128B and 128C. Rails 128A and 128C, like rails 125A and 125C, are spaced apart a distance slightly less than the length L of the partially cured panel 10 such that the panel can span the outer support rails and be supported thereby at its opposite ends. Central support rail 128B is disposed approximately intermediate outer end support rails 128A and 128C. Outer supports 128A and 128C each have upper support surfaces 128A' and 128C' which, like support surfaces 125A' and 125C' of the support 125, lie in a common horizontal plane 129. Central Support 128B has an upper support surface 128B' which is spaced below the plane 129 of support surfaces 128A' and 128C' by a distance Y. Distance Y, which may or may not be equal to differential distance X of support surfaces 125A', 125B' and 125C', is selected such that the partially cured mold 10, when spanning rails 128A and 128C, will be deflected in a direction countervailing the normal shrinkage deformation direction when a downward force F is applied to the upper surface 16 of the partially cured mold 10.

Figure 16:
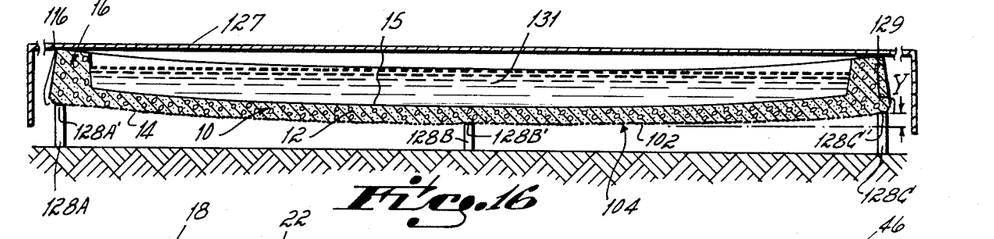
FIG. 16 is a diagrammatic view in cross section of a partially cured concrete panel deflected, by the weight of water contained therein, in a direction countervailing the normal shrinkage deformation direction.

Preferably the downward force F, which causes the partially cured mold supported at its ends by rails 128A and 128C and intermediate its ends by rail 128B to assume the deformed position shown in FIG. 16, is produced by a fluid 131 placed in the inverted panel. The fluid 131 preferably is water. The water serves the dual function of generating the force F necessary to deform the partially cured panel in a direction countervailing that of the normal shrinkage deformation, and additionally leeches alkali from the concrete. By leeching alkali during the curing process, alkali will not be drawn to the exposed rear surface 15 of the panel 10 when in use and subjected to water in the form of rain or the like. Thus, the alkali leeching which results during the curing step depicted in FIG. 16 prevents the exposed rear surface 15 of a panel 10, when used, from becoming discolored by alkali drawn to the surface of the panel when subjected to water in the form of rain or the like.

The partially cured panel when loaded with water 131 as shown in FIG. 16, preferably is provided with a cover 127. The cover 127 inhibits the evaporation of the water 131. Preferably the covered panel 10 is permitted to remain supported on support 128 in the deflected position shown in FIG. 16, and loaded with water 131, for approximately 5 days at 85°F. After this period of time the cover 127 is removed, the water 131 drained off, and the panel 10 is ready for use.

In a preferred form of the invention, wherein panels 10 are fabricated having the dimenisons noted earlier, the dimension X of FIG. 15 and the dimension Y of FIG. 16 are both approximately three-eighths inch.

As those skilled in the art will understand, a panel 10 even after being subjected to the partial and further curing steps discussed in connection with FIGS. 15 and 16, is still not fully cured. Concrete takes approximately one year to fully cure. However, it has been found in practice that a panel 10 constructed and dimensioned as described, after being subjected to the curing steps described in connection with FIGS. 15 and 16, will reach a strength of 4,000 psi. Ultimately, when the panel 10 has fully cured, which may occur after the panel has been installed as part of a fence or wall, it will achieve a final strength of approximately 5,000 psi. Additionally, it has been found in practice that panels 10 subjected to the partial and further curing steps depicted in connection with FIGS. 15 and 16, wherein the panel is deformed in a direction countervailing that of the normal shrinkage deformation, the panel will ultimately, i.e., upon full curing, assume a configuration in which the central section of the panel 12 is substantially flat, that is, is not deformed, as shown in solid lines in FIGS. 20(a) and 20(b).

Under certain conditions, such as when the flange depth D is small, it may be desirable to initially partially cure the panel 10 in a mold 30 which is maintained flat, that is, is not deflected in a direction countervailing normal shrinkage. In such event, however, it will be necessary to further cure the panel 10 upon removal from the mold 30 under deformed conditions as described in connection with FIG. 16.

The concrete used for forming the panels 10 is preferably "hard" concrete comprising one part by weight of cement and three parts by weight of a mixture of aggregate of up to three-eighths inch and sand. A panel fabricated in accordance with this invention, and having the preferred dimensions noted, weighs when wet, that is, prior to curing, approximately 225 pounds, and weighs when dry, that is, subsequent to the curing steps described in connection with FIG. 15 and 16, approximately 190 pounds.

To facilitate easy removal of the partially cured panel from the mold, the interior of the mold preferably is coated with a mold release oil composition of any commercially available type. Advantageously, this coating step is performed prior to positioning the reinforcing structure 18 in the mold 30, but subsequent to cleaning the mold after a panel forming operation.

While steel which has good wear qualities is preferable for use in fabricating the mold 30, wood and fiberglass as well as other mold materials may be used. Wood, because it absorbs moisture, and fiberglass, because it permanently distorts, are not as desirable as steel which neither absorbs moisture nor permanently distorts.

Following the further curing step of the panels 10 on the support 128, the panels are preferably stacked one on top of the other with their rear surfaces 15 uppermost and the rims 16 thereof in vertical alignment.

Spacers between adjacent panels 10 of the stack located at the corners thereof are advantageously provided, the spacers having a vertical dimension equal to the dimension X which the mold 30 deflects when on support 125 and which the panel deflects when on the support 128. With the panels 10 so stacked and separated from each other at the corners thereof with such spacers, the stacked panels, under the weight of the panel itself which has not fully cured, continue to assume a countervailing deflection as they undergo additional curing while stacked.

In certain applications, for example where wet concrete mixes are used and/or particularly long panels are being fabricated, it may be desirable to dispense with the step of filling the panels 10 with fluid when the panels undergo the further curing step on supports 128. In such case, the weight of the partially cured panel, when supported at its ends on support 128, is sufficient alone to deflect the panel in a direction countervailing the normal shrinkage direction, such deflection being accomplished without the necessity of applying a downward deflection force to the panel either by means of filling the panel with water or otherwise.

Having described my invention, I claim: 1

1. A method of making, in a desired final shape, fully cured concrete panels having integrally formed flanges extending from the perimeter of a central section, which panels undergo a normal curing shrinkage deformation in a specified direction in the course of fully curing, comprising the steps of:

pouring concrete into an open top elastically deflectable mold having a peripheral region defining a flange-molding cavity which surrounds the perimeter of a central region defining a central section-molding cavity, supporting said mold such that said mold, under the weight of said concrete, elastically deflects from its undeflected shape in a direction countervailing said specified normal curing shrinkage direction, partially curing said poured concrete panel while said mold is elastically deflected in said countervailing direction, removing said partially cured countervailingly deflected panel from said mold, and thereafter allowing said partially cured countervailingly deflected panel to fully cure and undergo its normal curing shrinkage deformation to thereby assume said desired final shape corresponding to that of said undeflected mold shape.

2. The method of claim 1 wherein said supporting step includes supporting said mold intermediate its opposite ends with the flanges of the panel extending upwardly whereby it elastically deflects downwardly at its ends in said specified countervailing direction under the weight of said poured concrete.

3. The method of claim 2 wherein said supporting step includes supporting said mold at point intermediate said ends, with the flanges of the panel extending upwardly said intermediate support being below the said end support whereby the downward deflection of said mold under the weight of said poured concrete is positively limited to a predetermined amount.

4. The method of claim 1 further including, between said removing and said fully curing steps, the steps of:

supporting said partially cured countervailingly deflected panel at opposite ends thereof with said central panel section substantially horizontal and said flanges directed upwardly, applying a downward force to said partially cured panel while supported at its opposite ends to deform said partially cured panel in said countervailing direction, and further curing said panel while supported at its opposite ends and deformed by said downward force.

5. The method of claim 1 further including the step of covering the open top of said mold during the partial curing step to control the evaporation of water from said panel during the partial curing thereof.

6. The method of claim 1 further including, between said removing and fully curing steps, the steps of:

supporting said partially cured countervailingly deflected panel at opposite ends thereof with said central panel section substantially horizontal and said flanges directed upwardly, said supporting being effective to permit said partially cured panel to deflect under its own weight in a direction countervailing said specified normal curing shrinkage direction, and further curing said panel while supported at its opposite ends thereof and deformed under its own weight.

7. The method of claim 1 including, between said removing and fully curing steps, the further step of stacking said countervailingly deflected panel on top of another panel with the flanges thereof extending upwardly and with spacers between adjacent panels at the ends thereof to facilitate deflection of said stacked panel, under its own weight, in a direction countervailing said normal shrinkage direction.

8. A method of making, in a desired final shape, fully cured concrete panels having integrally formed flanges extending from the perimeter of a central section, which panels undergo a normal curing shrinkage deformation in a specified direction in the course of fully curing, comprising the steps of:

pouring concrete into an open top elastically deflectable mold having a peripheral region defining a flange-molding cavity which surrounds the perimeter of a central region defining a central section-molding cavity, elastically deflecting said mold from its undeflected shape in a direction countervailing said specified normal curing shrinkage direction, partially during said poured concrete panel while said mold is elastically deflected in said countervailing direction, and thereafter removing said partially cured countervailingly deflected panel from said mold and allowing said countervailingly deflected partially cured panel to fully cure and undergo its normal curing shrinkage deformation externally of said mold to thereby assume said desired final shape corresponding to that of said undeflected mold shape.

9. A method of making, in a desired final shape, fully cured concrete panels having integrally formed flanges extending from the perimeter of a central section, which panels undergo a normal shrinkage deformation in a specified direction in the course of fully curing, comprising the steps of:

pouring concrete into a mold having a peripheral region defining a flange-molding cavity which surrounds the perimeter of a central region defining a central section-molding cavity, forming said panel while in said mold to a shape countervailing said specified normal shrinkage deformation,
partially curing said panel while countervailingly deformed in said mold, and
thereafter removing said partially cured countervailingly deformed panel from said mold and allowing said partially cured, countervailingly deformed panel while removed from said mold to fully cure and undergo its normal curing shrinkage deformation to thereby assume said desired final shape.

* * * * *

UNITED STATES PATENT OFFICE
CERTIFICATE OF CORRECTION

Patent No. 3,789,102      Dated January 29, 1974

Inventor(s) Earl T. Hazelett, Jr.

It is certified that error appears in the above-identified patent and that said Letters Patent are hereby corrected as shown below:

Column 18, Line 48 (Claim 8), "during" should read --curing--.

Signed and sealed this 9th day of April 1974.

(SEAL)
Attest:

EDWARD M. FLETCHER, JR.　　　　　　　　　C. MARSHALL DANN
Attesting Officer　　　　　　　　　　　　Commissioner of Patents